(12) United States Patent
Soulie et al.

(10) Patent No.: US 7,359,771 B2
(45) Date of Patent: Apr. 15, 2008

(54) METHOD TO PROVIDE WIRELESS BROADBAND COMMUNICATION TO A HIGH-SPEED MOVABLE VEHICLE

(75) Inventors: Antoine Soulie, Paris (FR); Jean-Claude Faye, Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/608,199

(22) Filed: Dec. 7, 2006

(65) Prior Publication Data

US 2007/0179689 A1 Aug. 2, 2007

(30) Foreign Application Priority Data

Feb. 1, 2006 (EP) .................... 06300096

(51) Int. Cl.
*G06F 17/00* (2006.01)
(52) U.S. Cl. .......................... 701/19; 701/20
(58) Field of Classification Search ............ 701/19–20
See application file for complete search history.

(56) References Cited

U.S. PATENT DOCUMENTS 7,280,074 B1 * 10/2007 Chi et al. ............ 343/700 MS

FOREIGN PATENT DOCUMENTS

| EP | 1 499 152 A1 | 1/2005 |
| EP | 1 585 354 A1 | 10/2005 |
| EP | 1585354 A1 * | 10/2005 |

OTHER PUBLICATIONS whitepapers.zdnet.co.uk "WiMAX, making ubiquitous high-speed data services a reality" Alcatel, Jun. 28, 2004.*
whitepapers.Zdnet.co.uk, Publisher's Description of White Paper: "WiMAX, making ubiquitous high-speed data services a reality", Alcatel, Jun. 28, 2004—http://whitepapers.zdnet.co.uk/O,1000000651,260100374p,OO.htm.*
Alcatel Strategy White Paper, 2004 (from above referenced website or Alcatel).*
X. Liang et al, "Mobile Internet Access for High-Speed Trains via Heterogeneous Networks", Personal, Indoor and Mobile Radio Communications, 2003. PIMRC 2003. 14$^{TH}$ IEEE proceedings, Sep. 7-10, 2003, Piscataway, NJ, USA, IEEE, Sep. 7, 2003, pp. 177-181, XP010681580.

(Continued)

*Primary Examiner*—Khoi H. Tran
*Assistant Examiner*—Jonathan Goldfarb
(74) *Attorney, Agent, or Firm*—Sughrue Mion, PLLC

(57) ABSTRACT

A method for providing wireless broadband communication to a high-speed movable vehicle, in particular to a high-speed train (2), is described, said method comprising the steps of:

Arranging Worldwide Interoperability for Microwave Access (WIMAX) base stations (6) along a route (1) the vehicle (2) moves along, Arranging Wireless Local Area Network (WLAN) hot spots (5) along the route (1) between said WIMAX base stations (6), Upon detection of a vehicle speed ($v_v$) above a predefined speed threshold ($v_{th}$) establishing a communication (10) to said vehicle (2) using said WLAN hot spots, Upon detection of a vehicle speed ($v_v$) below said speed threshold ($v_{th}$) establishing a communication to said vehicle (2) over said WIMAX base stations (6).

Furthermore a communication network to be used to execute the method mentioned above, plus a computer program product causing a computer to perform said method is described.

7 Claims, 3 Drawing Sheets

OTHER PUBLICATIONS

Eun Kyoung Paik et al, "Prediction-based fast handoff for mobile WLANs", TELECOMMUNICATIONS, 2003. ICT 2003. 10$^{TH}$ International Conference On Feb. 23-Mar. 1, 2003, Piscataway, NJ, USA<IEEE, vol. 1, Feb. 23, 2003, pp. 748-753, XP010637896.

"Strategies for Combatting Base Station Failure in Highway Microcellular Clusters", Electronics Letters, IEE Stevenage, GB, vol. 24, No. 21, Oct. 13, 1988, pp. 1339-1340, XP000032497.

* cited by examiner

METHOD TO PROVIDE WIRELESS BROADBAND COMMUNICATION TO A HIGH-SPEED MOVABLE VEHICLE

Method to provide wireless broadband communication to a high-speed movable vehicle The invention is based on a priority application EP06300096.2 which is hereby incorporated by reference.

TECHNICAL FIELD

The invention relates to a method for providing wireless broadband communication to a high-speed movable vehicle, in particular to a high-speed train.

BACKGROUND OF THE INVENTION

With increasing mobility it is important to provide communication on a high level of quality, like e.g. a high-speed Internet access, particularly to means of travel that are frequently used for business travels. Such means of travel can be e.g. trains, particularly high speed trains such as the French Train a Grande Vitesse (TGV), the German Inter City Express (ICE), the Japanese Bullet Train Shikansen and the like, magnetically levitated trains such as the Transrapid and the like, all movable with speeds up to 400 km/h and above, but also fast driving motorcars and the like. It is also thinkable to provide such communication to airplanes particularly to such airplanes flying at altitudes below 10.000 ft. Those means of travel are further called 'vehicles'. Furthermore, providing communication to a vehicle means to provide communication to a network or a communication system that is installed in the vehicle itself as well as to passengers and their mobile devices such as laptops and the like traveling with the vehicle.

To provide such communication, wireless networks seem to be practical.

Thereby three different aspects have to be considered:
1. To guarantee a total coverage of the wireless network along a route such a vehicle moves.
2. To guarantee communication on a constant high level of quality at all speeds the vehicle moves.
3. To guarantee an economically justifiable solution.

Furthermore, a main criterion in providing wireless communication services such as email and web browsing is, that from the user point of view, the response time must be lower than some seconds.

To provide such wireless networks basically two technologies are known.

The first technology is WLAN (Wireless Local Area Network) that is also known as Wireless Fidelity (WiFi). The advantage of WLAN is, that it provides communication at all speeds a vehicle moves. To guarantee a total coverage along a route the vehicle moves, so called WLAN hot spots have to be arranged along the route. The drawback of WLAN is that to provide communication to a vehicle, a very high number of WLAN hot spots are required along the route, since the theoretical outdoor range to be covered by WLAN is only about 20 km, assuming a Line of Sight (LoS), wherein the practical useable range is only about 1 to 2 km, i.e. 500 to 1000 m in each direction.

The second technology is WIMAX (Worldwide Interoperability for Microwave ACCess). WIMAX is similar to WLAN in concept, meaning it also permits the carrying of internet packet data, wherein WIMAX has the advantage over WLAN that it provides a higher performance, i.e. it permits usage over much greater distances. Both, WLAN and WIMAX provide broadband communication with data rates beyond 10 Mb/s. WIMAX theoretically provides up to 50 km of linear service area range and allows connectivity between users without a direct line of sight. The practical useable range of WIMAX is about 10 to 20 km, 5 to 10 km in each direction, i.e. 5 to 20 times higher than the WLAN range. The drawback of WIMAX is that for fast moving vehicles communication via WIMAX is impossible due to Doppler shift. Up to now WIMAX can only be used for vehicle speeds up to 120 km/h.

Both technologies mentioned above use terrestrial networks based on optical fiber to connect via a central switch e.g. to the Internet. Regarding WLAN, the advantages of a cheap installation of single WLAN hot spots due to widely spread technology is defeated, since civil engineering costs for laying terrestrial optical fiber in ground are in the range of 10 k€/km. By providing WLAN communication to a vehicle, the WLAN hot spots have to be arranged directly along the route because of short range of WLAN coverage. Due to this WLAN communication requires optical fibers along the route, e.g. along a railway track. Regarding WIMAX and considering its higher range, existing terrestrial networks at least partly can be used.

Other known technologies such as solutions based on satellites do not work in tunnels. Due to this they are not considered here.

SUMMARY OF THE INVENTION

An object of the invention is to provide wireless communication to, from and between vehicles, particularly high speed movable vehicles.

The object of the invention is met by the proposed method for providing wireless broadband communication to a high-speed movable vehicle, in particular to a high-speed train, wherein said method comprises the steps of:

Arranging WIMAX base stations along a route the high-speed movable vehicle moves along, e.g. a railway track, a motorway and the like, Arranging WLAN hot spots along the route between said WIMAX base stations, Upon detection of a vehicle speed above a predefined speed threshold establishing a communication to said vehicle using said WLAN hot spots, Upon detection of a vehicle speed below said speed threshold establishing a communication to said vehicle over said WIMAX base stations.

The basic idea of the invention is to combine both technologies, wherein WLAN is used for vehicle speed domains higher than the WIMAX mobile speed limit, that is actually around 120 km/h, and hand over to WIMAX connection for train speed below. Preferably the WIMAX base stations provide a backhaul network for the WLAN hot spots. Doing so, no vast terrestrial network is required to connect the WLAN hot spots with a central switch and the like.

Said method according to the invention has the advantage over the state of the art, that:

WIMAX enables to have a continuous coverage especially when the train stops in a zone without WLAN coverage.

Compared to prior art, the number of WIFI access point can be reduced along the route, e.g. because no WLAN hot spots have to be installed in sections of the route the vehicle moves slow, i.e. slower than the predefined speed threshold. Such sections can be e.g. motorway or railway sections with a speed limit below the speed threshold.

If WIMAX is used as a backhaul network for the WLAN hot spots, installation costs due to civil engineering costs for laying optical fibers into ground are reduced dramatically.

In a preferred embodiment of said invention, only along sections of the route the vehicle moves or can move with a speed higher than the predefined speed threshold, e.g. regarding a railway track, in sections the train is allowed to move faster than the predefined speed threshold, or regarding a motorway, in sections with no or a higher speed limit than the predefined speed threshold, WLAN hot spots preferably connected to WiMAX modems are arranged between the WIMAX base stations, which provide backhauling for the above said hot-spots.

In another preferred embodiment of said invention, along sections of the route the vehicle moves or can move with a speed higher than the predefined speed threshold, no WIMAX base stations are arranged.

In an additional preferred embodiment of said invention, the distance between proximate WIMAX base stations is about 5 to 20 km, wherein the distance between proximate WLAN hot spots is preferably about 1 to 2 km. In practice, the coverage of WiFi is in the range of 1 km, with a coverage of 500 m on the left and 500 m on the right of each access point. The WIMAX base station will realistically cover 20 km: 10 km on the left and 10 km on the right. Therefore, using WIMAX as a backhauling network for the WLAN hot spots, one WiMAX base station is connected to 20 Modems, each connected to one WiFi AP.

In a particularly preferred embodiment of said invention, the WIMAX base stations are used as backhauling network for reaching WLAN access points Thereby it is thinkable that the WIMAX base stations are connected to an Internet backbone via either a light fiber optics cable or a directional microwave link. Doing so, WIMAX serves as a very high bandwidth backhaul for Internet traffic from WLAN remote areas back to the backbone. Providing a WIMAX backhaul network comprising several WIMAX base stations can be done in three partly complementary ways:

If a terrestrial network comprising optical fiber already laid down already exists along the route, the WIMAX base stations are connected to these. This solution is already a gain versus a solution where fiber is connected to each individual WLAN access point, due to the need to have specific and expensive Fiber and/or Ethernet converters that increase the price of such a solution, here WIMAX avoids using too many such converters.

A WIMAX base station may be self-backhauled by means of two WIMAX modems located in between 2 contiguous WIMAX base stations. Those two modems relay the emission from one base station to another.

A WIMAX base station is connected to a modem, likely not located along the track. The modem is again connected to the WLAN access point.

Another aspect of the invention concerns a communication network for providing wireless broadband communication to a high-speed movable vehicle, in particular to a high-speed train, said communication network comprises:

WIMAX base stations arranged along a route a vehicle moves along,

WLAN hot spots arranged between the WIMAX base stations along the route, at least in sections the vehicle is allowed to move faster than a predefined threshold, Means to detect the vehicle speed, Means to decide, if the vehicle speed is above or below said predefined threshold, Means to establish a connection to said vehicle via said WIMAX base stations, if the vehicle speed detected is lower than said predefined threshold, Means to establish a connection to said vehicle via said WLAN hot spots, if the vehicle speed is higher than said threshold.

In another preferred embodiment of the invention, said method mentioned above is performed by a computer program product stored on a computer usable medium comprising computer readable program means for causing a computer to perform the method mentioned above, when said computer program product is executed on a computer.

DETAILED DESCRIPTION OF PREFERRED EMBODIMENTS

Figure 1:
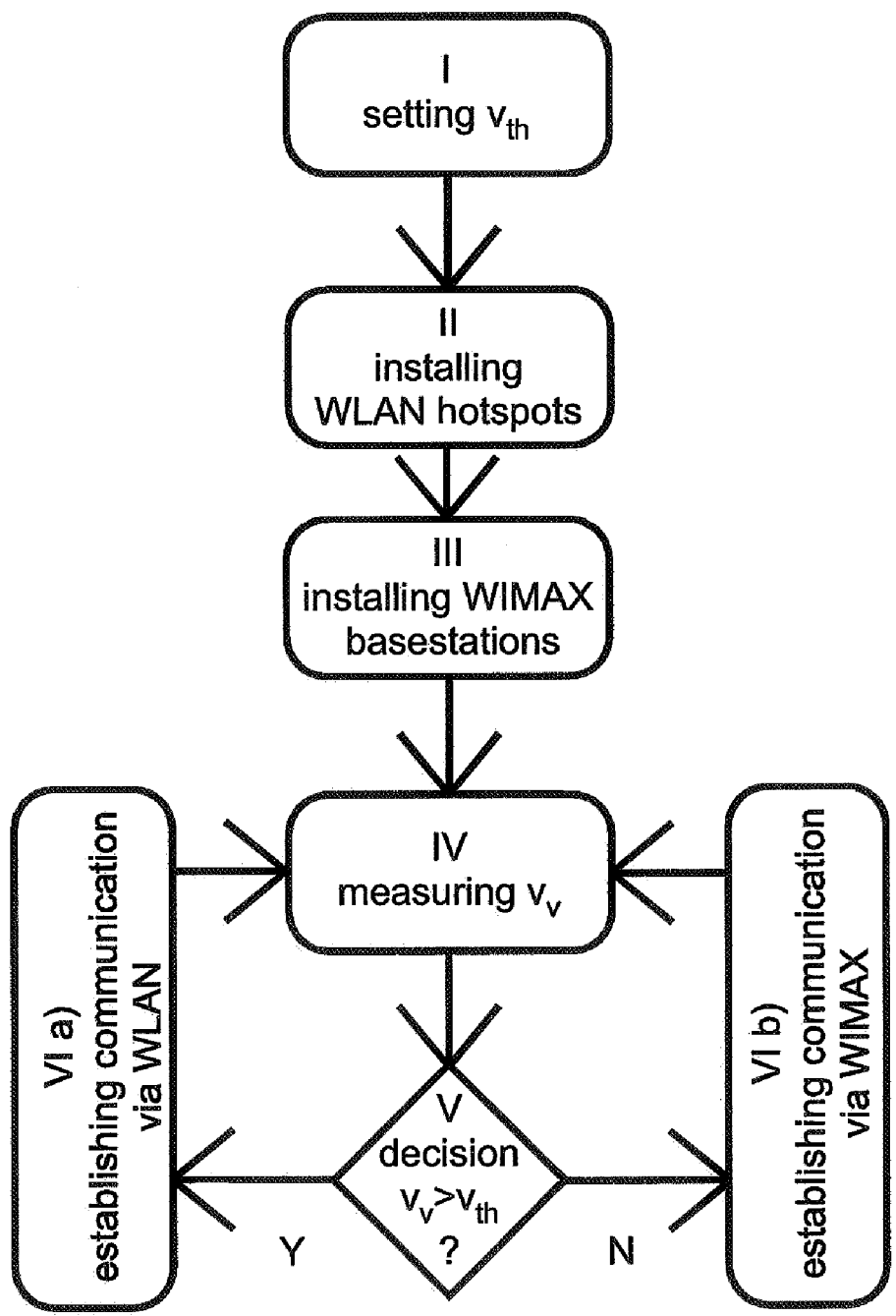
FIG. 1 showing a schematic flowchart of a method according to the invention.

A method according to the invention is executed in the following way (FIG. 1): In a first step I, a speed threshold $v_{th}$ is set. The speed threshold is set below a technically given speed limitation given by the network technologies used for the wireless communication. This technically given speed limitation is due to Doppler shift, depending on vehicle speed. This threshold can change with the development of wireless network technologies.

In a second step II WLAN hot spots are arranged along sections of a route having no or a higher speed limit than the predefined speed threshold. On such a section, a vehicle can move faster than the speed threshold mentioned above.

In a third step III WIMAX base stations are arranged along sections of a route having a speed limit lower than the predefined speed threshold. On such a section, a vehicle is not allowed to move faster than the speed threshold mentioned above.

In a fourth step IV, the actual vehicle speed $v_v$ is measured.

In a fifth step V it is decided, if the vehicle speed $v_v$ is higher or lower than the speed threshold $v_{th}$.

If the vehicle speed $v_v$ is higher than the speed threshold $v_{th}$, the method continues with step VI a), if the vehicle speed $v_v$ is lower than the speed threshold $v_{th}$, the method continues with step VI b).

In step VI a), when the vehicle speed $v_v$ is higher than the speed threshold $v_{th}$, a communication to the vehicle is established using the WLAN hot spots.

In step VI b), when the vehicle speed $v_v$ is lower than the speed threshold $v_{th}$, a communication to the vehicle is established using the WIMAX base stations.

The steps IV, V and VI are repeated continuously. It is important to mention that switching between the WIMAX and the WLAN technologies is a low frequency event, wherein nevertheless preferably a mechanism is provided to avoid oscillations at a vehicle speed around the speed threshold $v_{th}$.

Thereby it is thinkable to install WIMAX base stations also along sections with a speed limit higher than the speed threshold, to be used as backhauling network for reaching access points of a terrestrial network, and also to ensure communication if the vehicle speed falls below the speed threshold $v_{th}$.

Figure 2:
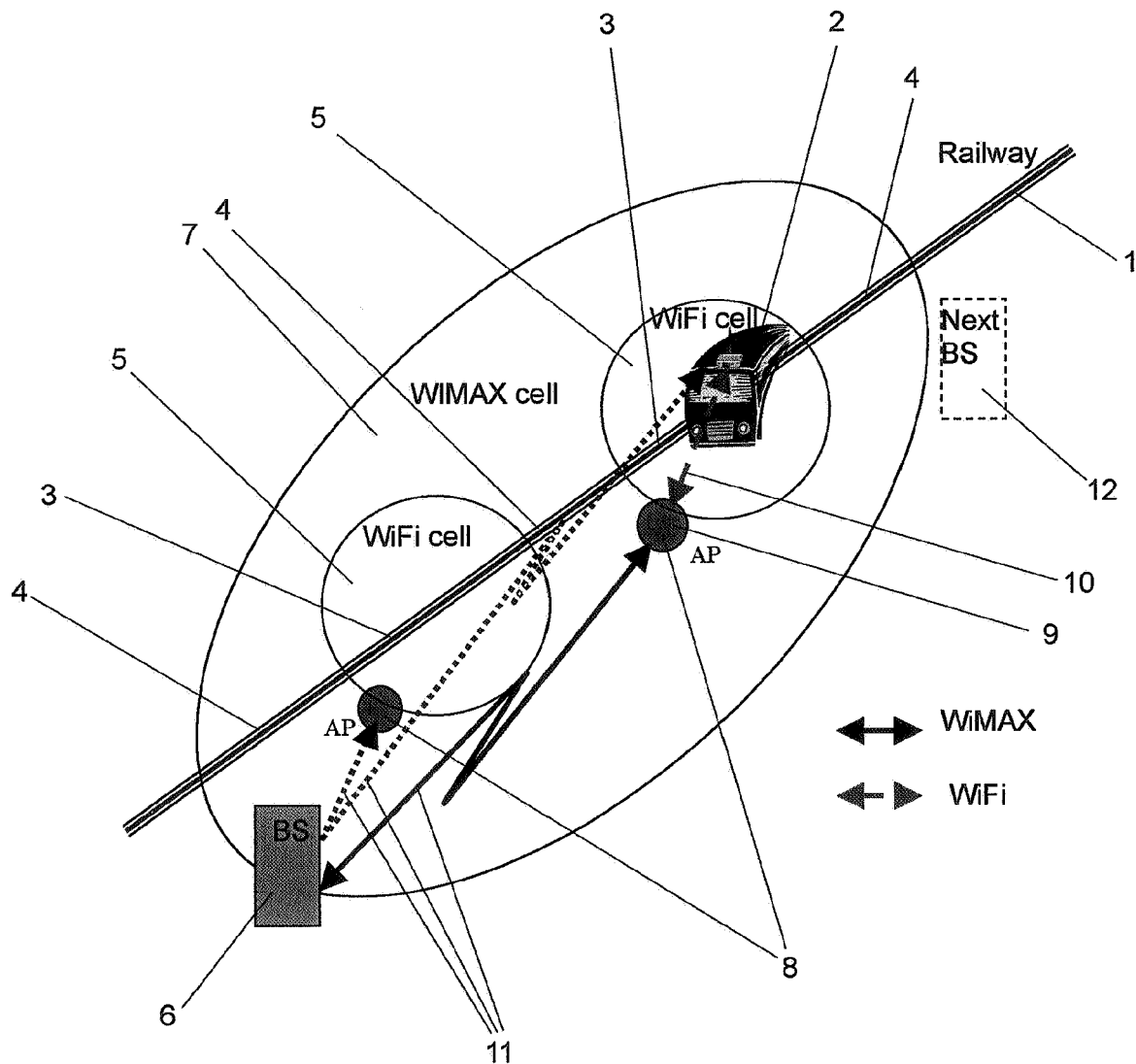
FIG. 2 showing a schematic view of the arrangement of WLAN hot spots and WIMAX base stations along a railway.

In FIG. 2 a railway 1 is shown. A high speed train 2 moves along the railway 1. Furthermore the railway 1 shows sections 3 with a speed limit higher than the speed threshold $v_{th}$. Between those sections 3, sections 4 are located having speed limits below the speed threshold $v_{th}$. The sections 3 are covered by WiFi or WLAN hot spots, forming WiFi cells 5, each one connected to the Internet via a WLAN Access Point (AP) 8. The WLAN APs 8 are backhauled to the Internet by a WIMAX Base Station (BS) 6. Thereby FIG. 2 has to be understood schematically since more than one WLAN AP 8 has to be arranged along a section 3 with a speed limit higher than the speed threshold $v_{th}$, if the length of a section 3 exceeds the range of one WLAN hot spot. In such a case more than one WLAN hot spot together form a WiFi cell 5 covering the section 3. Thereby it is also thinkable that a section 3 is not totally covered by WLAN hot spots, wherein in this case buffers are needed since the coverage is discontinuous.

The WIMAX BS 6 is arranged besides the railway 1, forming a WIMAX cell 7. The WIMAX cell 7 covers the sections 4 and also the WiFi cells 5. The distance between adjacent WIMAX base stations 6, 12 preferably is about 5 to 20 km. Between two adjacent WIMAX base stations 6, WiFi AP 8 are located. The WIMAX base station (BS) 6 together with its WIMAX cell 7 is used as backhauling network for reaching the access points 8 of the WiFi cells 5, i.e. to connect the WiFi hot spots and thus the WiFi cells 5 itself to the Internet.

The train 2 is equipped with means to receive signals via both WiMAX and WiFi technology. If the train 2 moves faster than the speed threshold $v_{th}$ inside the WiFi cells 5, wireless communication takes place via the WiFi hot spots. If the train moves slower than the speed threshold $v_{th}$ inside or outside the WiFi cells 5, wireless communication takes place via the WIMAX base station. The speed $v_v$ of the train can be obtained e.g. via GPS (Global Positioning System) and the like. As shown in FIG. 2, the train 2 moves at a speed $v_v$ higher than the speed threshold $v_{th}$ within a section 3 with a speed limit higher than the speed threshold $v_{th}$.

According to the invention, WiMAX can be used as a backhaul network. This situation is shown in FIG. 2, wherein communication between the train 2 and the access point 9 takes place via WiFi (arrow 10), wherein communication between the WIFI access point 9 and the Internet takes place via WIMAX and the WIMAX base station 6 (arrows 11).

Doing so, the technical problem to provide broadband access to vehicles moving at changing speeds, particularly also at high speeds up to 350 km/h and above, such as high speed trains, is solved.

Figure 3:
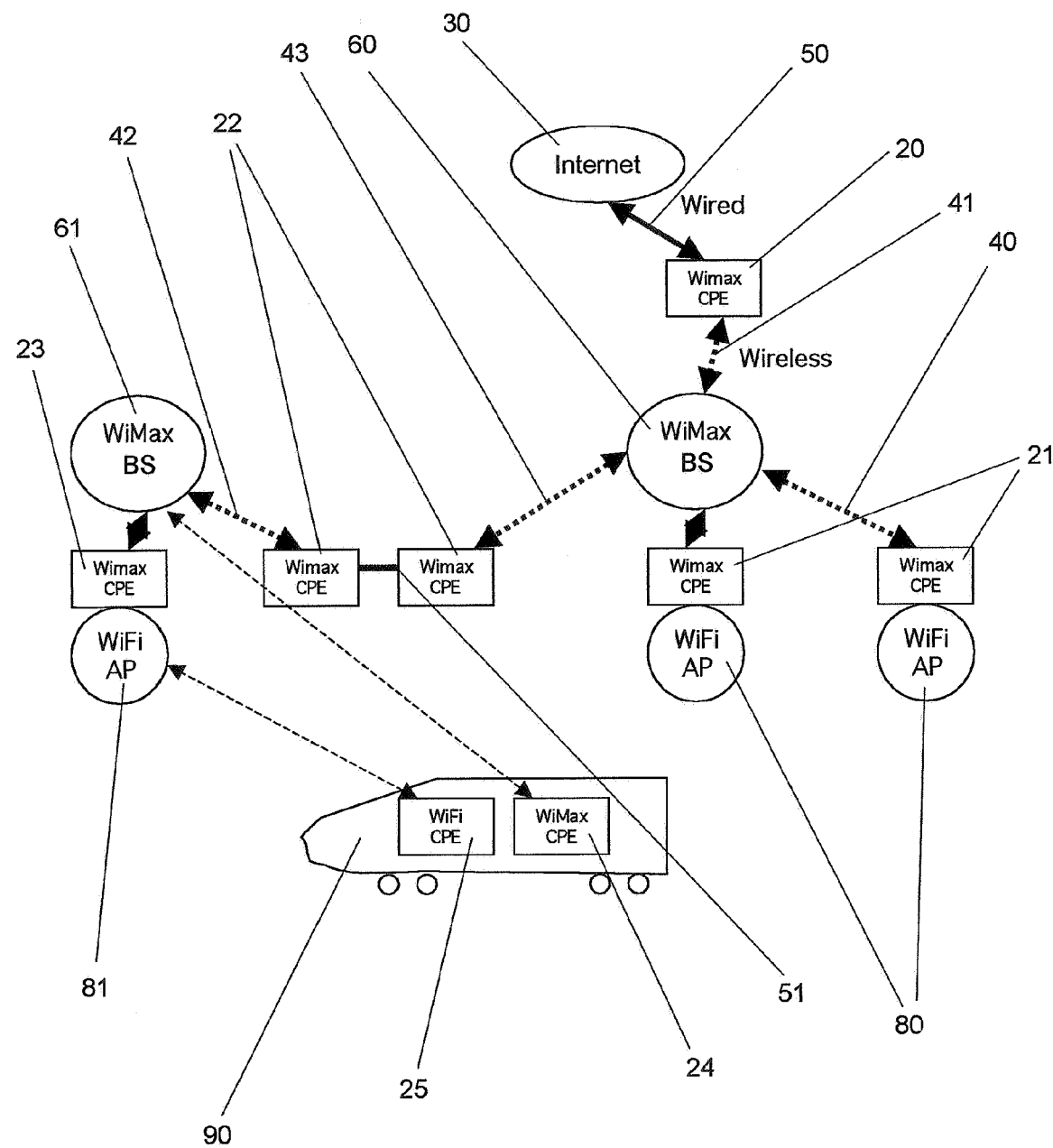
FIG. 3 showing a schematic view of a backhauling network using WIMAX base stations.

In FIG. 3 two complementary ways to use WIMAX as a backhauling network for WiFi hot spots are shown. Thereby the network linking the WiFi APs and a central switch that is connected with the Internet is called backhaul network, wherein FIG. 3 highlights the backhaul network without showing the central switch that is beyond the WIMAX transport network.

The first way to use WIMAX as a backhauling network is to connect a WIMAX base station 60 by means of a WIMAX Customer Premise Equipment (CPE) 20, also called WIMAX modem, to the Internet 30. A plurality of CPEs 21 each one connected with one WiFi access point 80 are connected to the WIMAX base station 60 via wireless connections 40. The WIMAX base station 60 itself is connected with the CPE 20 via a wireless connection 41, wherein the CPE 20 is connected to the Internet 30 via optical fiber 50. The function provided by this solution is a so called direct packet connectivity between the WIMAX CPE 20 close to the Internet 30 and other CPEs 21 connected with WiFi access points 80.

The second way is that a WIMAX base station 61 itself is backhauled by means of two WIMAX CPEs 22 located in between two contiguous WIMAX base stations 60, 61. The CPEs 22 are connected with each other via optical fiber 51, wherein the connections between the CPEs and the base stations 60, 61 are wireless connections 42, 43. Those two CPEs 22 relay the emission from one base station to another, e.g. from the WIMAX base station 60 to the WIMAX base station 61 and vice versa. WiFi access points 81 are wireless connected via CPEs 23 with the backhauled WIMAX base station 61, and via the WIMAX base station 61, the CPEs 22 the WIMAX base station 60 and the CPE 20 to the Internet 30. The WIMAX base station 61 is not located along the route of the train 90. It is only used to backhaul WiFi access points 81 that are located along a section of the route with a speed limit higher than the speed threshold $v_{th}$. In the train 90, a WIMAX CPE 24 and a WiFi CPE 25 is arranged to provide wireless communication with the Internet 30 at all speeds.

Furthermore it is thinkable to extend the arrangement shown in FIG. 3 with a plurality of relays in each direction, i.e. WIMAX CPEs 22 relaying the emission from one base station to another.

It is important to mention that a basic idea of the invention is to use two wireless network technologies, WiMAX and WiFi, between the terrestrial network, i.e. the 'cable' network based on optical fiber, and the vehicle, taking the advantages of both:

WIMAX is used up to its mobile speed limit. By using WIMAX a continuous coverage with a very good response time is obtained, even if the train stops between two WIMAX Base Stations.

WLAN is used for higher vehicle speed. WLAN allows higher vehicle speeds due to much wider sub-carriers and higher data rates/sub carrier. The distance between adjacent hot spots takes into account the required response time, wherein the high speed of the train limits the number of Access Points (AP) along the route.

The following advantages are achieved by the invention:

The solution works with vehicles movable at high speed, such as high speed or bullet trains, also when the vehicle passes tunnels or is stopped.

The solution uses present technology. Due to this it allows easy upgrading existing wireless networks.

The solution supports high speed data rates as it is based on high speed technologies.

The solution allows to optimize the number of short range WLAN hot spots as they are only used on sections of the route vehicles, like e.g. trains are allowed to accelerate to high speeds.

Furthermore it is important to mention that at least for the beginning of the traffic, voice traffic requiring continuous coverage is not needed, so that a discontinuous WiFi coverage is sufficient in the beginning.

It is also thinkable that with the development of other technologies providing higher performance in communication between local base stations and vehicles at certain speeds, additional speed thresholds are introduced to use each technology at a speed level it performs best.

COMMERCIAL APPLICABILITY

The invention is commercially applicable particularly in the field of production and operation of networks for wireless communication and data transmission.

LIST OF REFERENCE NUMERALS $v_{th}$ speed threshold
$v_v$ vehicle speed
1 railway
2 high speed train
3 section of railway with speed limit higher than speed threshold
4 section of railway with speed limit lower than speed threshold
5 WiFi or WLAN cell
6 WIMAX base station
7 WIMAX cell
8 Access Point
9 Access Point
10 WiFi or WLAN communication
11 WIMAX communication
12 WIMAX base station
20 WIMAX CPE, connecting a WIMAX base station with the Internet
21 WIMAX CPE, used to connect WiFi or WLAN access point
22 WIMAX CPE, used as relay between WIMAX base stations
23 WIMAX CPE, used to connect WiFi or WLAN access point
24 WIMAX CPE, arranged in train
25 WiFi CPE, arranged in train
30 Internet
40 wireless connection
41 wireless connection
42 wireless connection
43 wireless connection
50 optical fiber
51 optical fiber
60 WIMAX base station
61 WIMAX base station
80 WiFi access point
90 train

The invention claimed is:

1. A method for providing wireless broadband communication to a high-speed movable vehicle, said method comprising:
    arranging Worldwide Interoperability for Microwave Access (WIMAX) base stations along a route the vehicle moves along,
    arranging Wireless Local Area Network (WLAN) hot spots along the route between said WIMAX base stations,
    upon detection of a vehicle speed above a predefined speed threshold establishing a communication to said vehicle using said WLAN hot spots,
    upon detection of a vehicle speed below said speed threshold establishing a communication to said vehicle over said WIMAX base stations.

2. The method according to claim 1, wherein only along sections of the route the vehicle moves with a speed above the predefined speed threshold WLAN hot spots are arranged.

3. The method according to claim 1, wherein along sections of the route the vehicle moves with a speed above the predefined speed threshold, no WIMAX base stations are arranged.

4. The method according to claim 1, wherein the distance between proximate WIMAX base stations is about 5 to 20 km.

5. The method according to claim 1, wherein the WIMAX base stations are used as backhauling network for WLAN reaching access points.

6. A communication network to be used to execute the method according to claim 1, wherein
    WIMAX base stations arranged along a route a vehicle moves along,
    WLAN hot spots arranged between the WIMAX base stations along the route, at least in sections the vehicle is allowed to move with a speed above a predefined threshold,
    means to detect the vehicle speed,
    means to decide, if the vehicle speed is above or below said predefined threshold,
    means to establish a connection to said vehicle via said WIMAX base stations, if the vehicle speed detected is below said predefined threshold,
    means to establish a connection to said vehicle via said WLAN hot spots, if the vehicle speed is above said threshold.

7. A computer program product stored on a computer usable medium comprising computer readable program means for causing a computer to perform the method of claim 1, when said computer program product is executed on a computer.

* * * * *